United States Patent
Gumpoltsberger

[19]

[11] Patent Number: 6,159,123
[45] Date of Patent: Dec. 12, 2000

[54] GEARBOX WITH RETARDER

[75] Inventor: Gerhard Gumpoltsberger, Friedrichshafen, Germany

[73] Assignee: ZF Friedrichshafen AG, Friedrichshafen, Germany

[21] Appl. No.: 09/292,696

[22] Filed: Apr. 15, 1999

[30] Foreign Application Priority Data

Apr. 22, 1998 [DE] Germany .......................... 198 17 865

[51] Int. Cl.$^7$ .............................. F16D 57/02; F16H 3/44
[52] U.S. Cl. ........................... 475/116; 475/109; 188/291; 188/140 A
[58] Field of Search ................................. 475/116, 104, 475/107, 109; 477/59; 188/307, 308, 309, 291, 140 A

[56] References Cited

U.S. PATENT DOCUMENTS

| | | | |
|---|---|---|---|
| 4,497,219 | 2/1985 | Elsner | 475/113 |
| 4,614,131 | 9/1986 | Hall | 475/23 |
| 4,641,549 | 2/1987 | Muller | 477/62 |
| 4,699,022 | 10/1987 | Stadt et al. | 477/59 |
| 4,715,481 | 12/1987 | Brosius | 188/291 |
| 4,744,443 | 5/1988 | Brosius | 188/292 |
| 5,029,682 | 7/1991 | Maurer et al. | 475/28 |
| 5,954,607 | 9/1999 | Nitsche et al. | 475/42 |

FOREIGN PATENT DOCUMENTS

| | | |
|---|---|---|
| 25 21 831 | 11/1976 | Germany . |
| 25 36 805 | 2/1977 | Germany . |
| 30 26 773 C2 | 2/1981 | Germany . |
| 29 35 361 C2 | 7/1985 | Germany . |
| 38 37 142 A1 | 5/1989 | Germany . |
| 2 107 007 | 4/1983 | United Kingdom . |
| 2 109 488 | 6/1983 | United Kingdom . |

OTHER PUBLICATIONS

*Nutzfahrzeug*, "Retarder rechnen sich", Dec. 1991, pp. 32–40.
*Zahnradgetriebe*, "Springer–Verlag" by Johannes Looman, $3^{rd}$ edition, 1996, pp. 305 and 310.
Looman, Johannes, "Zahnradgetriebe", Springer–Verlag, Berlin, u.a., $3^{rd}$ edition, 1996, 322, 323.

*Primary Examiner*—Rodney H Bonck
*Assistant Examiner*—Ha Ho
*Attorney, Agent, or Firm*—Davis and Bujold

[57] ABSTRACT

The invention concerns a vehicle transmission for commercial vehicles having an additional continuous braking device wherein the additional continuous braking device, in addition to braking, is provided as a startup retarder (2) to start the vehicle.

19 Claims, 4 Drawing Sheets

GEARBOX WITH RETARDER

BACKGROUND OF THE INVENTION

The invention concerns a transmission for commercial vehicles.

Together with the service brakes of a vehicle, especially of a commercial vehicle, which as a rule are friction brakes subject to wear, additional deceleration devices such as retarders are being increasingly required by law and offered by vehicle manufacturers. A wear-free brake is required, particularly in city autobuses, but also in other vehicles, in order to improve operating costs and operating safety.

Belonging to retarders are hydrodynamic, hydrostatic or electrodynamic braking devices situated on both the transmission or engine and those systems which are provided within the transmission housing. Moreover, retarders are separated into primary retarders, which work depending on the engine speed, and secondary retarders, which work depending on the vehicle speed. Retarders for automatic transmissions of commercial vehicles, having planetary gear sets, are mainly operated as primary retarders. Such arrangements are known, for example, from the article "Retarder rechnen sich" in the periodical "Nutzfahrzeug", December 1991, pp. 32 ff.

Different methods are distinguished for actuating the retarder. The braking action is controlled in stages or continuously within the scope of the maximum operational efficiency of the retarder.

Motor vehicles with internal combustion engines are started by different methods:
with a mere speed converter (starting clutch dry or wet);
with a speed and torque converter (triloco converters) of different designs;
geared-neutral by transmissions having infinite ratio or by hydrostatic or electromotor transmissions.

In autobuses having automatic transmissions, hydrodynamic converters are at present used almost without exception.

In the past, a torque converter was often sought to be used wear-free brake (retarder), for example, it has been described by Johannes Looman, "Zahnradgetriebe", page 310, 3rd edition 1996, Springer-Verlag, that holding the stator of a torque converter of an automatic transmission, for omnibuses, stationary lets the converter act as a retarder. In the same book, page 305, this was also similarly described for another automatic transmission for commercial vehicles where the converter was also used at the same time as hydrodynamic brake.

Such retarders have, however, disadvantages of difficult control of the braking power and of poor braking power under certain circumstances.

The problem on which the invention is based is to simplify the structural design and to reduce the number of parts in an automatic transmission.

According to the invention the problem is solved by using a wear-free braking element for starting instead as well as a starting element being used as a retarder.

For this purpose a hydrodynamic retarder is combined with a planetary gear set.

SUMMARY OF THE INVENTION

A planetary gear set of a planetary transmission has two kinematic degrees of freedom and one static degree of freedom so that when presetting a torque for an input shaft, the torques are determined on both output shafts. But if a speed is preset, the two other speeds resulting therefrom still are not determined. Consequently, to obtain defined speed ratios, two speeds must be preset. If a planetary gear set is set in the power train of a motor vehicle, one shaft becomes connected with the crankshaft of a prime mover, with a second shaft being the output shaft. The remaining third shaft of the planetary gear set is connected with a retarder. For starting, the speed of the third shaft is preset, the output standing still while the input shaft revolves at the engine speed. But if the torque still has not been applied to the retarder shaft, then no torque is transmitted to the output shaft, which results from the necessary torque balance. If the retarder is charged, it can reinforce a torque on the housing whereby a torque can act upon the output. This operation is similar to the closing of a conventional clutch. But with an adequate configuration of the planetary gear set, increased torque results which does not occur in a conventional clutch.

The starting acceleration is determined by control of the retarder braking torque. Due to acceleration of the output, the speed of the retarder shaft decreases and at the end of the starting operation the retarder is locked up. This can result due either to a brake, for example, in the form of a multi-disc brake, or to a lock-up clutch. After the starting operation, the retarder is used as a primary retarder for wear-free brakes. In order to be able to brake using starting retarder, it must be locked up, that is, the planetary gear set must revolve as a block. Otherwise, it is conceivable that the engine speed may be unfavorably affected, which could lead to an overspeed of the engine, since the engine shaft is accelerated in an open arrangement.

A starting retarder can be disposed in different manners:
as an independent unit consisting of a planetary gear set, retarder, lock-up clutch and an eventual brake before or after a transmission, or
integrated in an existing planetary transmission.

In the second case, the transmission must have a sufficient starting ratio. The retarder must be connected with a shaft, which in the first and reverse gears has to be braked or supported on the housing. If the retarder is used only for forward drive, a clutch/brake for the reverse gear is designed as the starting element.

As a substitute for a starting clutch, there results, by virtue of the starting retarder, the advantages of an additional ratio and of the hydraulic starting operation, which also results in an advantage in comfort.

Although as a substitute for a converter the allowance necessary for any damage due to gear spreading is compensated by the advantages relative to installation space, weight and price. This especially applies when a retarder must exist in any case.

The highest expense for retarders is the cooling of the oil during the braking operation which absorbs the kinetic energy as heat and has to emit said heat to a cooler in the region. An added expense for a starting retarder is the reverse direction of rotation of the retarder rotor during the starting operation. This is solved by a double-suction retarder in which the second circuit is bladed opposite to the first circuit to obtain a sufficient braking power in both directions of rotation. An electric retarder as eddy-current retarder or another braking device can also be used instead of a hydraulic retarder. In general, although these use a large installation space, they offer the advantage of better control of the braking power. In particular, this relates both to the ranges of lower relative speed and to the response and switching off times.

The invention is shown with reference to a drawing in which.

Figure 1:
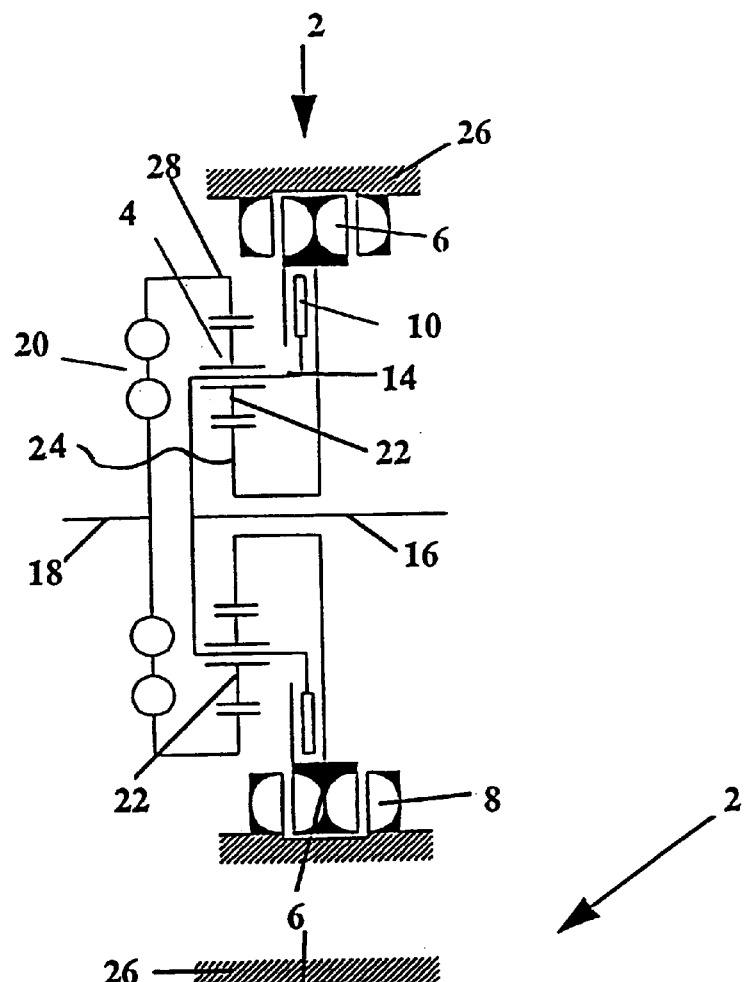
FIG. 1 is a first arrangement of a double-suction starting retarder.
Figure 2:
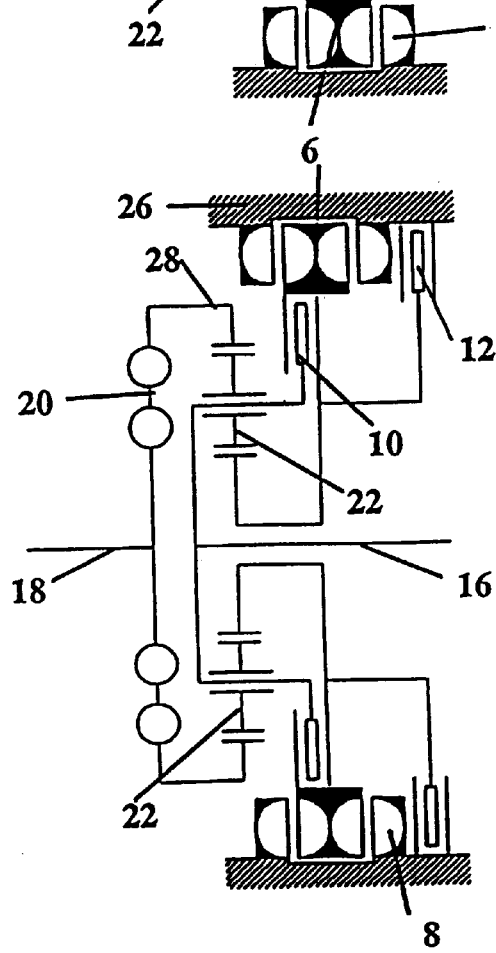
FIG. 2 is a second arrangement of a double-suction starting retarder.

A starting retarder 2 is shown in FIG. 1 and FIG. 2. The starting retarder 2 in FIG. 1 consists of a planetary gear set 4, a double-suction rotor 6, a stator 8 and a lock-up clutch 10. The lock-up clutch 10 is situated on the planetary gear carrier 14 which is connected with an output shaft 16 of the starting retarder. The starting retarder 2 is driven by an input shaft 18, which is connected with a prime motor (not shown). A ring gear 28 of the planetary gear set 4 is driven by the input shaft 18 via a vibration damper 20. Planetary gears 22 are meshed with a sun gear 24 and supported on the planet carrier 14. The double-suction rotor 6 is non-rotatably connected with the sun gear 24. The stator 8 is firmly situated on a housing 26 of the starting retarder 2.

FIG. 2 shows a second arrangement of a double-suction starting retarder 2 in which a lock-up brake 12 is additionally situated on the double-suction stator. Said lock-up brake 12 is eliminated during control of the lock-up operation by a clutch of the transmission.

To obtain a ratio increase by the starting retarder, a negative speed is generally decelerated in the retarder. In order that a retarder can efficiently brake, the blading from rotor and stator must be laid out in the direction of rotation. But in the opposite direction of rotation the braking action is minimal. Hence, there has to be a second retarder circuit which is designed on negative speeds which represents only a small extra expense. The ratio increase of the starting retarder must be in the range of the ratio steps of the first gear of the transmission, that is, substantially between 1.4 and 1.8.

A starting retarder 2, according to FIG. 1 and FIG. 2, can be arranged as a separate part front mounted in an independent transmission. The transmission that follows is a planetary transmission, a countershaft transmission, or one other transmission, such as a friction gear transmission, a belt-drive transmission, or a hydrostatic power-split transmission.

Figure 3:
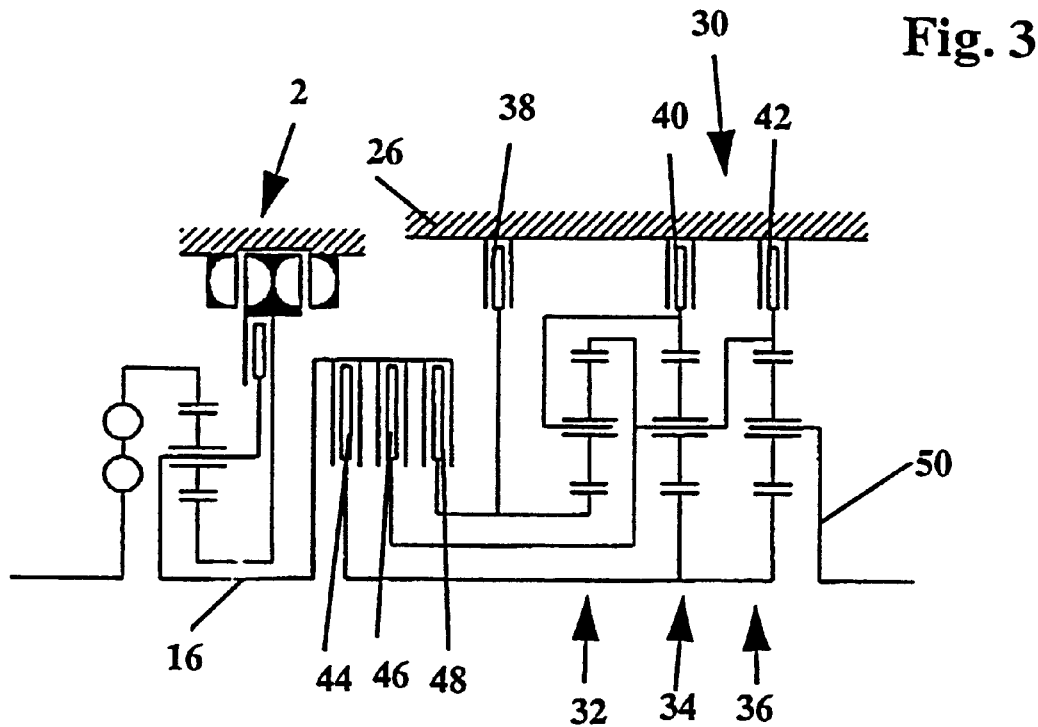
FIG. 3 is the arrangement according to FIG. 1 in an automatic transmission.

In FIG. 3 shown, byway of example, is an arrangement of a starting retarder as an individual part combined with a consecutive transmission. The starting retarder of FIG. 1 is combined in a construction known per se with a rear-mounted transmission of planetary design 30. The three planetary gear sets 32, 34 and 36 of the transmission 30 can be connected by brakes 38, 40 and 42 with the housing 26 and by clutches 44, 46 and 48 to the output shaft 16 of the starting retarder 2. The planet carrier 50 of the planetary gear set 26 forms the output shaft of the transmission 30.

Figure 4:
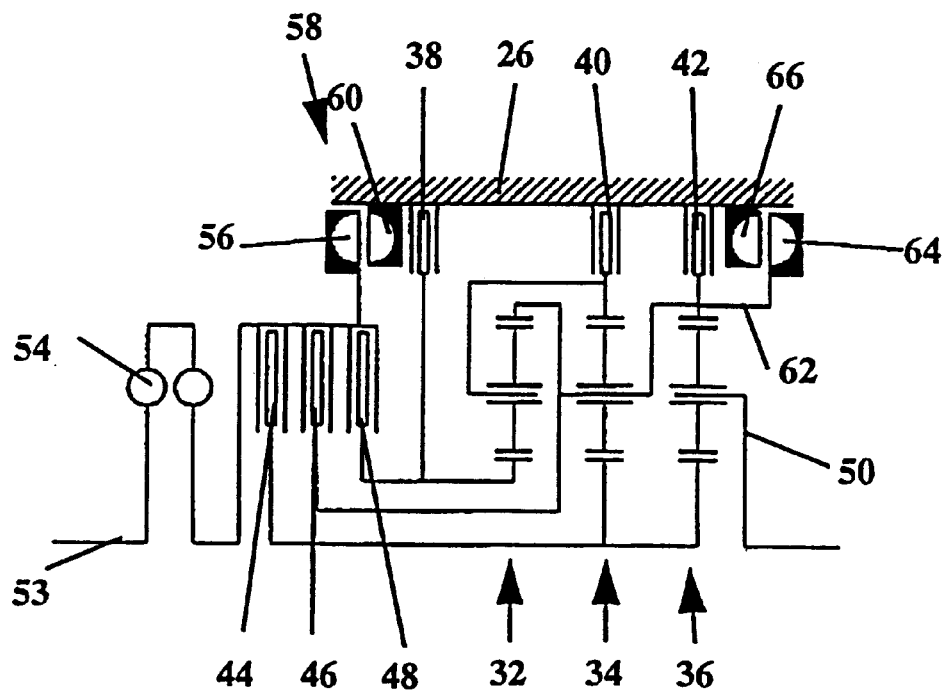
FIG. 4 is an arrangement in exploded view.

In FIG. 4 shown is the integration of a starting retarder 2 in a transmission of planetary design. In a transmission 58, the input shaft 53 is connected by a vibration damper 54 with the rotor 56 of a primary retarder, the stator 60 of which is situated on the housing 26. The arrangement of the brakes 38, 40 and 42 and of the clutches 44,46 and 48 corresponds to FIG. 3, there being additionally placed on the rings gear 62 of the planetary gear set 36 one other rotor 64 which interacts with a stator 66 fastened to the housing 26. The arrangement consisting of rotor 64 and stator 66 acts as integrated starting retarder.

Figure 5:
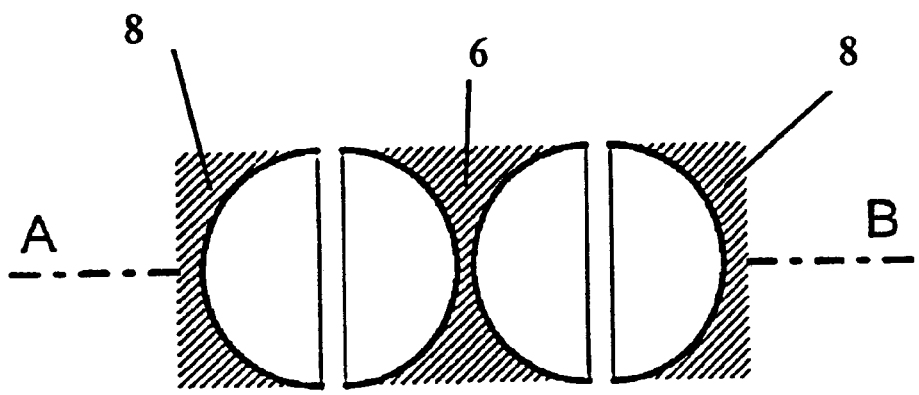
FIG. 5 is a double-suction starting retarder in section.
Figure 6:
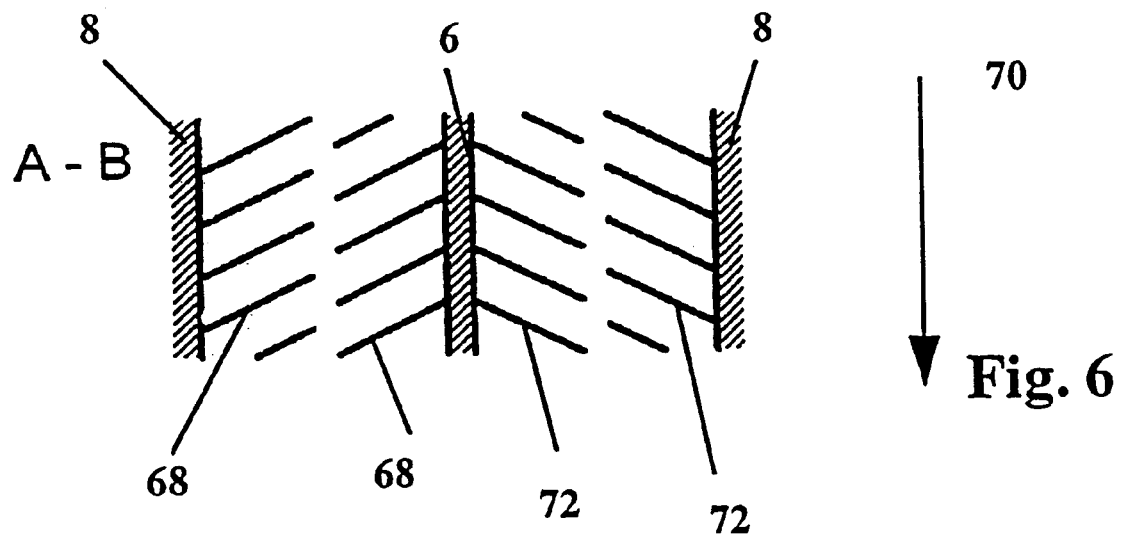
FIG. 6 is a section of the arrangement of FIG. 5.

FIG. 5 shows a section through a stator and rotor blading of a starting retarder 2, according to FIG. 1 and FIG. 2. The double-suction rotor 6 acts together with the stator parts 8. In FIG. 6 is shown in a section A-B, according to FIG. 5, the arrangement of the blading of rotor 6 and stator 8. In a first circuit, the blades 68 are situated in a first direction inclined to the peripheral direction 70. In a second circuit, the blades 72, situated in the second half of the rotor 6, are inclined relative to the blades 68 in a second opposite direction. Thereby is obtained a sufficient braking power in both directions of rotation.

Figure 7:
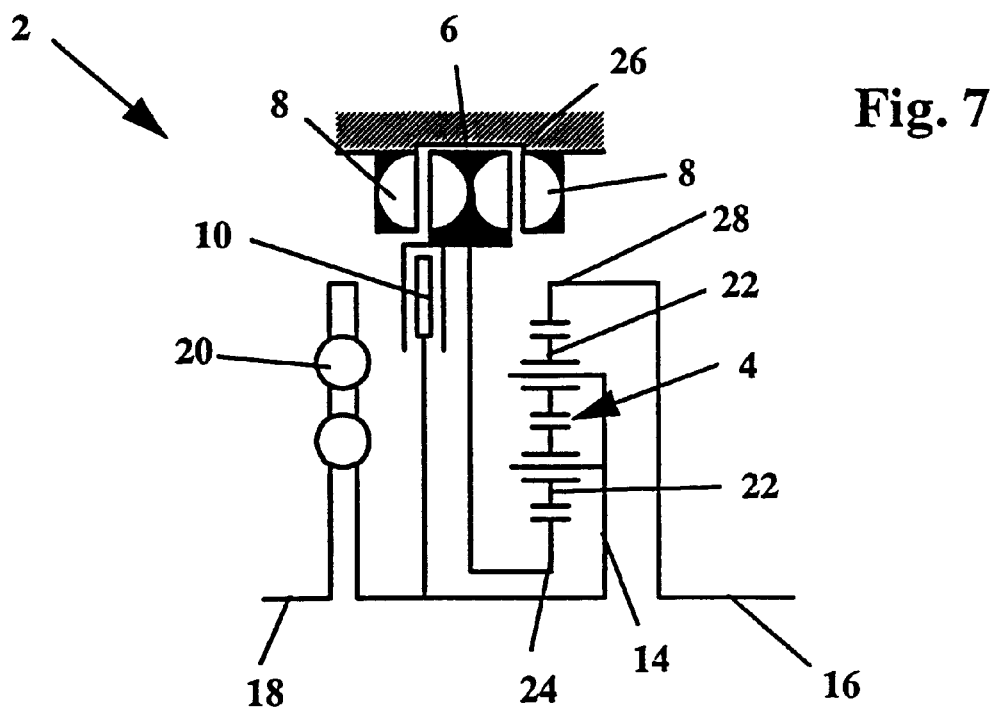
FIG. 7 is a third arrangement of a double-suction starting retarder.

One other starting retarder 2 is shown in FIG. 7. The starting retarder 2 comprises planetary gear set 4, double-suction rotor 6, stator 8 and lock-up clutch 10. The lock-up clutch 10 is located on the input shaft 18 of the starting retarder 2. The starting retarder 2 is driven by the input shaft 18, which is connected with a prime mover (not shown). The planet carrier 14 of the planetary gear set 4 is driven by the input shaft 18, via a vibration damper 20. The planetary gears 22 are meshed with a sun gear 24 and supported on the planet carrier 14. The double-suction rotor 6 is non-rotatably connected with the sun gear 24. The stator 8 is situated firmly on the housing 26 of the starting retarder 2. The ring gear 28 is non-rotatably connected with the output shaft 16.

Figure 8:
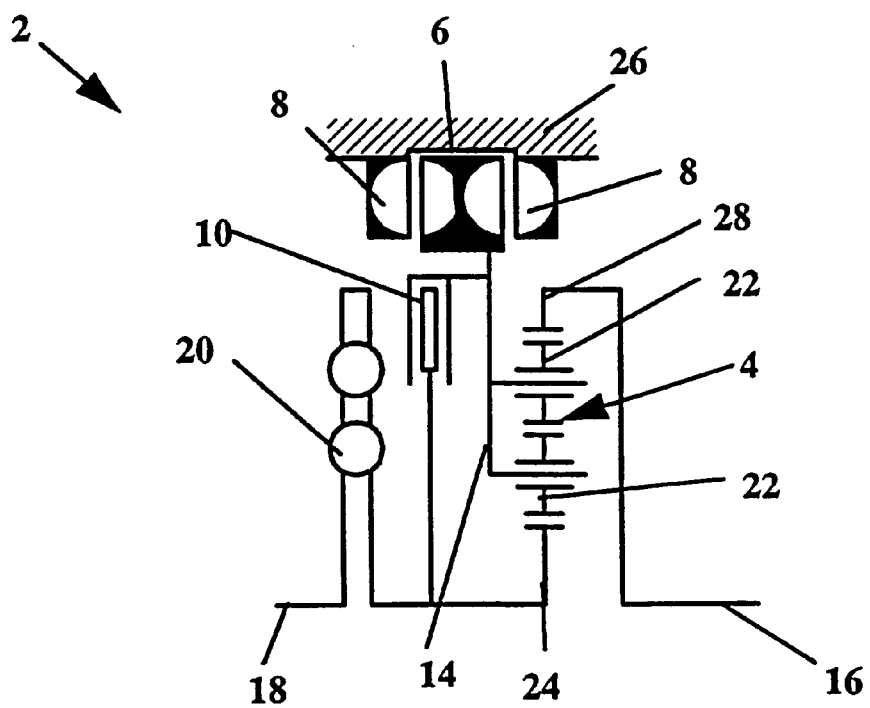
FIG. 8 is a fourth arrangement of a double-suction starting retarder.

FIG. 8 shows another variant of the starting retarder 2. The starting retarder 2 in FIG. 8 consists of planetary gear set 4, double-suction rotor 6, stator 8 and lock-up clutch 10. The lock-up clutch 10 is located on the planet gear carrier 14 which is connected with the rotor 6. The starting retarder 2 is driven by an input shaft, which is connected with a prime mover (not shown). The sun gear 24 of the planetary gear set 4 is driven by the input shaft 18, via a vibration damper 20. The planetary gears 22 are meshed with a ring gear 28 and supported on the planet carrier 14. Via the lock-up clutch 10 the sun gear 24 can be non-rotatably connected to the double-suction rotor 6. The stator 8 is firmly situated on the housing 26 of the starting retarder 2. The ring gear 28 is non-rotatably connected with the output shaft 16.

With the system according to the invention, a converter as a starting element can be eliminated in an automatic transmission. The starting retarder guarantees both starting and, in a deceleration process, a continuous braking device which supports a service brakes. The starting retarder can either be an integral part of the vehicle transmission or be front- or rear-mounted as a separate part on a transmission.

| Reference numerals | |
| --- | --- |
| 2 | starting retarder |
| 4 | planetary gear set |
| 6 | rotor |
| 8 | stator |
| 10 | lock-up clutch |
| 12 | brake |
| 14 | planetary gear carrier |
| 16 | output shaft |
| 18 | input shaft |
| 20 | vibration damper |
| 22 | planetary gear |
| 24 | sun gear |
| 26 | housing |
| 28 | ring gear |
| 30 | transmission |
| 32 | planetary gear set |
| 34 | planetary gear set |
| 36 | planetary gear set |
| 38 | brake |
| 40 | brake |

-continued

| Reference numerals | |
|---|---|
| 42 | brake |
| 44 | clutch |
| 46 | clutch |
| 48 | clutch |
| 50 | planet carrier |
| 52 | transmission |
| 53 | input shaft |
| 54 | vibration damper |
| 56 | rotor |
| 58 | primary retarder |
| 60 | stator |
| 62 | ring gear |
| 64 | rotor |
| 66 | stator |
| 68 | blade |
| 70 | peripheral direction |
| 72 | blade |

What is claimed is:

1. A vehicle transmission for a commercial vehicle having a continuous braking device which is used both as a starting retarder (2) for starting the vehicle as well as a continuously braking device for braking the vehicle;
    said starting retarder (2) comprising a rotor (6) and a planetary gear set (4); and
    the planetary gear set (4) comprising a ring gear (28), a plurality of planetary gears (22) and a sun gear, the ring gear (28) being connected to one of an input shaft (18) and an output shaft (16) and the ring gear (28) meshing with the plurality of planetary gears (22) supported by a planet carrier (14), and the planet carrier (14) being connected with the other of the output shaft (16) and the input shaft (18) of said planetary gear set (4);
    wherein the planetary gear set (4) is connectable with the rotor (6) of said starting retarder (2) via a lock-up clutch (10).

2. The vehicle transmission according to claim 1, wherein said rotor (6) can be connected by a brake (12) with a housing (26).

3. The vehicle transmission according to claim 1, wherein the connection between said input shaft (18) and said planetary gear set (4) has a vibration damper (20).

4. The vehicle transmission according to claim 1, wherein said starting retarder (2) is a separate component which is one of front-mounted and rear-mounted to said vehicle transmission (30).

5. The vehicle transmission according to claim 1, wherein said starting retarder (56, 60, 64, 66) is integrated into said transmission (52).

6. The vehicle transmission according to claim 1, wherein said starting retarder (2) is formed by a hydrodynamic retarder comprising the rotor (6) and a stator (8).

7. The vehicle transmission according to claim 6, wherein said hydrodynamic retarder (6, 8) is designed with double suction by the blades (72) of a second circuit being disposed opposite to the blades (68) of a first circuit in order to obtain sufficient braking power in both directions of rotation.

8. The vehicle transmission according to claim 1, wherein said starting retarder (2) is an electric retarder.

9. The vehicle transmission according to claim 1, wherein said starting retarder (2) is provided for starting movement of the vehicle in a forward drive direction and one of a clutch and a brake is provided for starting movement of the vehicle in a reverse drive direction.

10. The vehicle transmission according to claim 1, wherein the ring gear (28) is connected to the output shaft (16) and the planet carrier (14) is connected with the input shaft (18).

11. The vehicle transmission according to claim 10, wherein a vibration damper (20) connects the input shaft (18) with said planet carrier (14).

12. The vehicle transmission according to claim 10, wherein said starting retarder (2) is formed by a hydrodynamic retarder which comprises the rotor (6) and a stator (8).

13. The vehicle transmission according to claim 12, wherein said hydrodynamic retarder is a double suction retarder which has a first circuit with a first set of blades (72) disposed in a first direction and a second circuit with a second set of blades (68) disposed in an opposite direction to the direction of the first set of blades (72) to obtain sufficient braking power in both directions of rotations of said hydrodynamic retarder.

14. The vehicle transmission according to claim 10, wherein said starting retarder (2) is provided for starting movement of the vehicle in a forward drive direction and one of a clutch and a brake is provided for starting movement of the vehicle in a reverse drive direction.

15. The vehicle transmission according to claim 1, wherein the ring gear (28) is connected to the output shaft (16) and the planet carrier (14) is connected with the input shaft (18) via said rotor (6) and the lock-up clutch (10).

16. The vehicle transmission according to claim 15, wherein a vibration damper (20) connects the input shaft (18) with said sun gear (24).

17. The vehicle transmission according to claim 15, wherein said starting retarder (2) is formed by a hydrodynamic retarder which comprises the rotor (6) and a stator (8).

18. The vehicle transmission according to claim 17, wherein said hydrodynamic retarder is a double suction retarder which has a first circuit with a first set of blades (72) disposed in a first direction and a second circuit with a second set of blades (68) disposed in an opposite direction to the direction of the first set of blades (72) to obtain sufficient braking power in both directions of rotations of said hydrodynamic retarder.

19. The vehicle transmission according to claim 15, wherein said starting retarder (2) is provided for starting movement of the vehicle in a forward drive direction and one of a clutch and a brake is provided for starting movement of the vehicle in a reverse drive direction.

* * * * *